United States Patent
Young et al.

(10) Patent No.: US 6,733,142 B1
(45) Date of Patent: May 11, 2004

(54) IMAGE PROJECTOR SYSTEM OPERABLE IN A SLIDE PROJECTION MODE AND A LIQUID CRYSTAL PROJECTOR MODE

(75) Inventors: Tai-Fa Young, Kaohsiung (TW); Sung-Hua Tsai, Kaohsiung (TW)

(73) Assignee: Emerging Display Technologies Corp., Kaohsiung (TW)

( * ) Notice: Subject to any disclaimer, the term of this patent is extended or adjusted under 35 U.S.C. 154(b) by 0 days.

(21) Appl. No.: 10/635,592

(22) Filed: Aug. 5, 2003

(51) Int. Cl.[7] .............................................. G03B 21/14

(52) U.S. Cl. .................... 353/122; 353/68; 353/119; 353/120

(58) Field of Search .............................. 353/68, 119–20, 353/122

(56) References Cited

U.S. PATENT DOCUMENTS 5,772,301 A * 6/1998 Kwon et al. ................. 353/122

* cited by examiner

Primary Examiner—Russell Adams
Assistant Examiner—Michael Dalakis
(74) Attorney, Agent, or Firm—Darby & Darby

(57) ABSTRACT

An image projector system includes a cold light source, a projection lens, a slide retaining unit, and a liquid crystal module. The slide retaining unit is disposed between the cold light source and the projection lens, and is adapted to retain removably a projector slide between the cold light source and the projection lens when the image projector system is operated in a slide projection mode. The liquid crystal module includes a liquid crystal panel retained removably on the slide retaining unit between the cold light source and the projection lens to permit operation of the image projector system in a liquid crystal projection mode.

12 Claims, 4 Drawing Sheets

IMAGE PROJECTOR SYSTEM OPERABLE IN A SLIDE PROJECTION MODE AND A LIQUID CRYSTAL PROJECTOR MODE

BACKGROUND OF THE INVENTION

1. Field of the Invention

The invention relates to an image projector system, more particularly to an image projector system operable in a slide projection mode and a liquid crystal projection mode.

2. Description of the Related Art

In U.S. Pat. No. 6,547,400, there is disclosed an image projector system that includes a point light source array, a light guide block, a liquid crystal display element, and a projection lens. The aforesaid image projector system, however, is not designed for use with projector slides.

SUMMARY OF THE INVENTION

Therefore, the object of the present invention is to provide an image projector system that is operable in a slide projection mode and a liquid crystal projection mode.

According to the present invention, an image projector system includes a cold light source, a projection lens, a slide retaining unit, and a liquid crystal module. The slide retaining unit is disposed between the cold light source and the projection lens, and is adapted to retain removably a projector slide between the cold light source and the projection lens when the image projector system is operated in a slide projection mode. The liquid crystal module includes a liquid crystal panel retained removably on the slide retaining unit between the cold light source and the projection lens to permit operation of the image projector system in a liquid crystal projection mode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
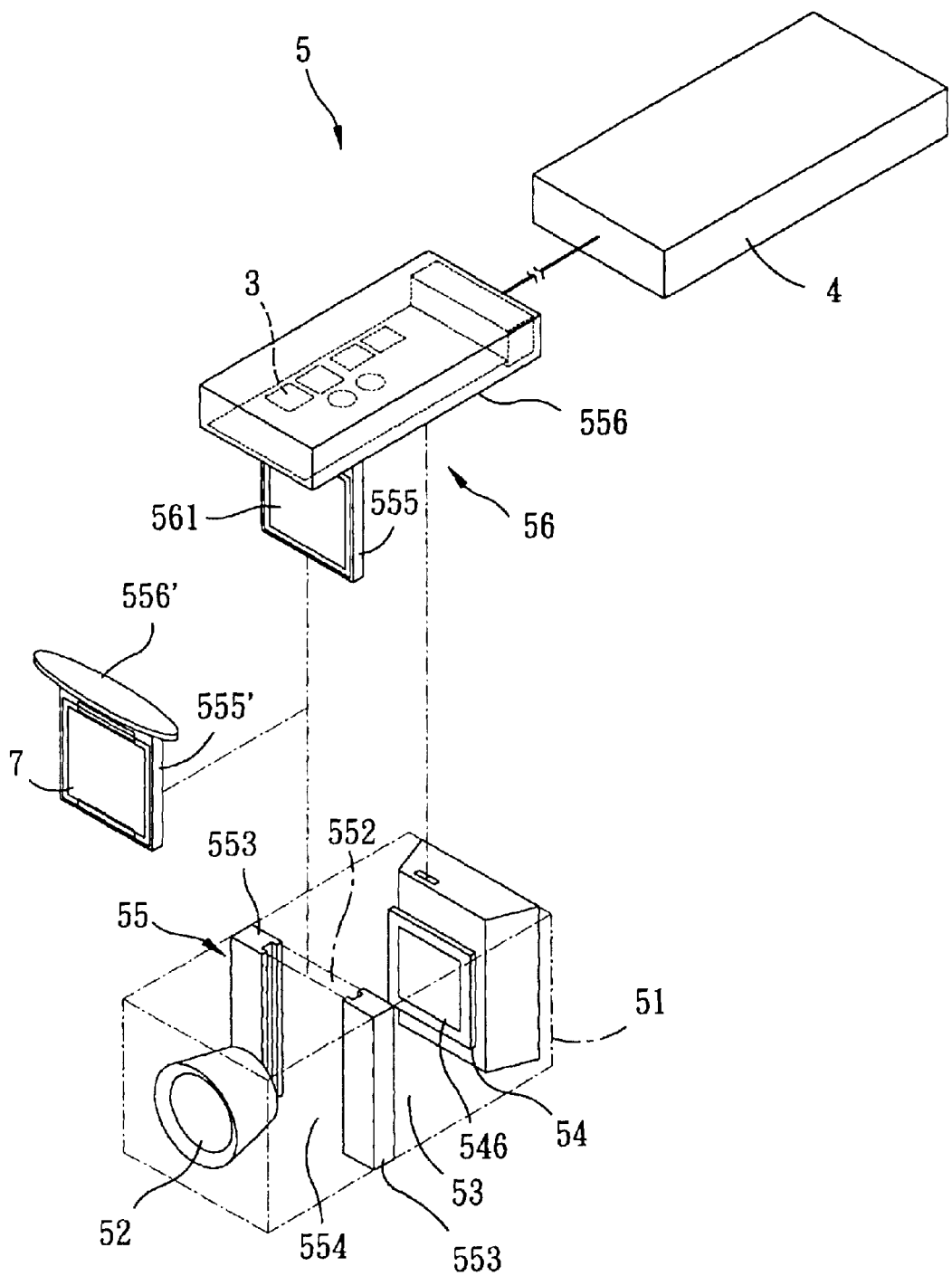
FIG. 1 is a partly exploded perspective view of the preferred embodiment of an image projector system according to the present invention.

Referring to FIG. 1, the preferred embodiment of an image projector system 5 according to the present invention is shown to include a housing 51, a projection lens 52, a cold light source 54, a slide retaining unit 55, and a liquid crystal module 56.

The housing 51 has front and rear portions. The projection lens 52, which is conventional in construction, is mounted on the front portion of the housing 51. The cold light source 54 is mounted in the rear portion of the housing 51. An operating space 53 is formed in the housing 51 between the projection lens 52 and the cold light source 54.

Figure 2:
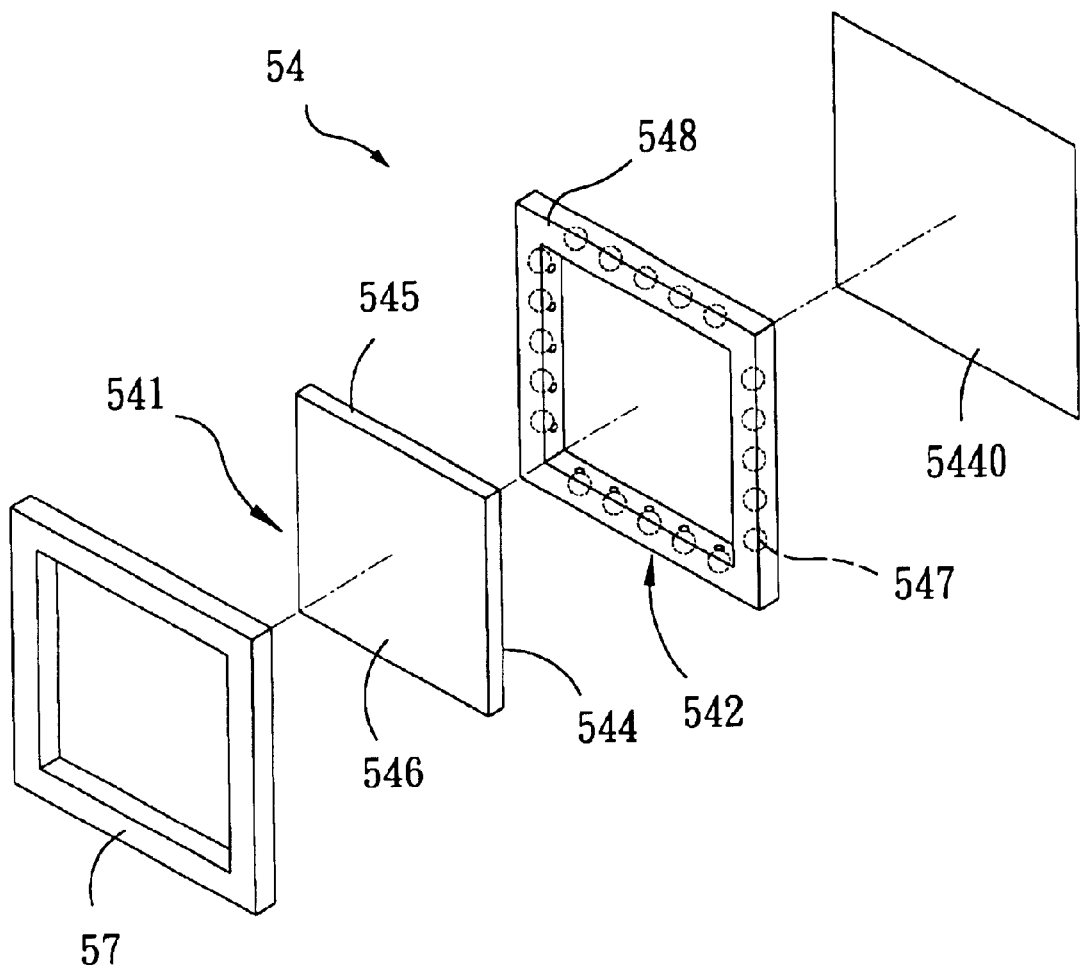
FIG. 2 is an exploded perspective view of a cold light source of the preferred embodiment.

As shown in FIG. 2, the cold light source 54 includes a light guide member 541 having a light incident side 545 for admitting incident light and a light output side 546 for outputting the incident light, and a light emitting unit 542 for providing the incident light to the light incident side 545 of the light guide member 541. In this embodiment, the light guide member 541 further has a light reflecting side 544 opposite to the light output side 546 and provided with a reflector layer 5440 thereon. The light incident side 545 extends between the light reflecting side 544 and the light output side 546. The light emitting unit 542 of this embodiment includes a rectangular mounting frame 548 and a plurality of light emitting diodes 547 mounted spacedly on the mounting frame 548 adjacent to the light incident side 545 of the light guide member 541. A covering frame 57 is provided on a periphery of the cold light source 54.

The actual configuration of the cold light source 54 should not be limited to that of the disclosed embodiment. For instance, if high intensity diodes are in use, the light emitting unit may include only one diode row or even only one diode. Moreover, the cold light source may be implemented using a backlighting module with a cold cathode lamp, or other forms of cold light sources having a planar light output side for radiating cold light toward the slide retaining unit 55, such as those fabricated using organic Light Emitting Diode (OLED) or Polymer Light Emitting Diode (PLED) techniques, in which a plastic or glass substrate is coated with an organic or polymeric light emitting material so as to provide a planar light output side for radiating cold light when electric power is supplied thereto.

Referring once again to FIG. 1, the slide retaining unit 55 is disposed in the operating space 53 of the housing 51 between the projection lens 52 and the cold light source 54. The housing 51 is formed with a slide insert slot 552 registered with the slide retaining unit 55. In this embodiment, the slide retaining unit 55 includes a pair of slide rails 553, each of which extends downward from a respective end of the slide insert slot 552 so as to define a retaining space 554 therebetween.

The liquid crystal module 56 includes a slide frame 555 having a conventional liquid crystal panel 561 mounted thereon, a cover member 556 connected to one end of the slide frame 555, and a known control circuit 3 disposed in the cover member 556 and connected electrically to the liquid crystal panel 561. The cover member 556 is provided with a connector, such as a USB port connector or an AV port connector (not shown), to permit connection of the control circuit 3 to an image signal source 4. The image signal source 4 may be a computer, a personal digital assistant (PDA), a digital camera, a VCR, a DVD player, a memory card reader, or other forms of image output devices. The slide frame 555 is capable of removable and slidable engagement with the slide rails 553 of the slide retaining unit 55 so as to retain removably the liquid crystal panel 561 in the retaining space 554 between the cold light source 54 and the projection lens 52. The cover member 556 closes the slide insert slot 552 when the slide frame 555 is inserted into the housing 51 to prevent leakage of light through the slide insert slot 552, as best shown in FIG. 3.

The image projector system 5 further comprises a second slide frame 555' adapted for mounting a projector slide 7 thereon and capable of removable and slidable engagement with the slide rails 553 of the slide retaining unit 55 so as to retain the projector slide 7 in the retaining space 554 between the cold light source 54 and the projection lens 52. The slide frame 555' has one end formed with a cover plate 556' to close the slide insert slot 552 when the slide frame 555' is inserted into the housing 51 to prevent leakage of light through the slide insert slot 552, as best shown in FIG. 4.

Figure 3:
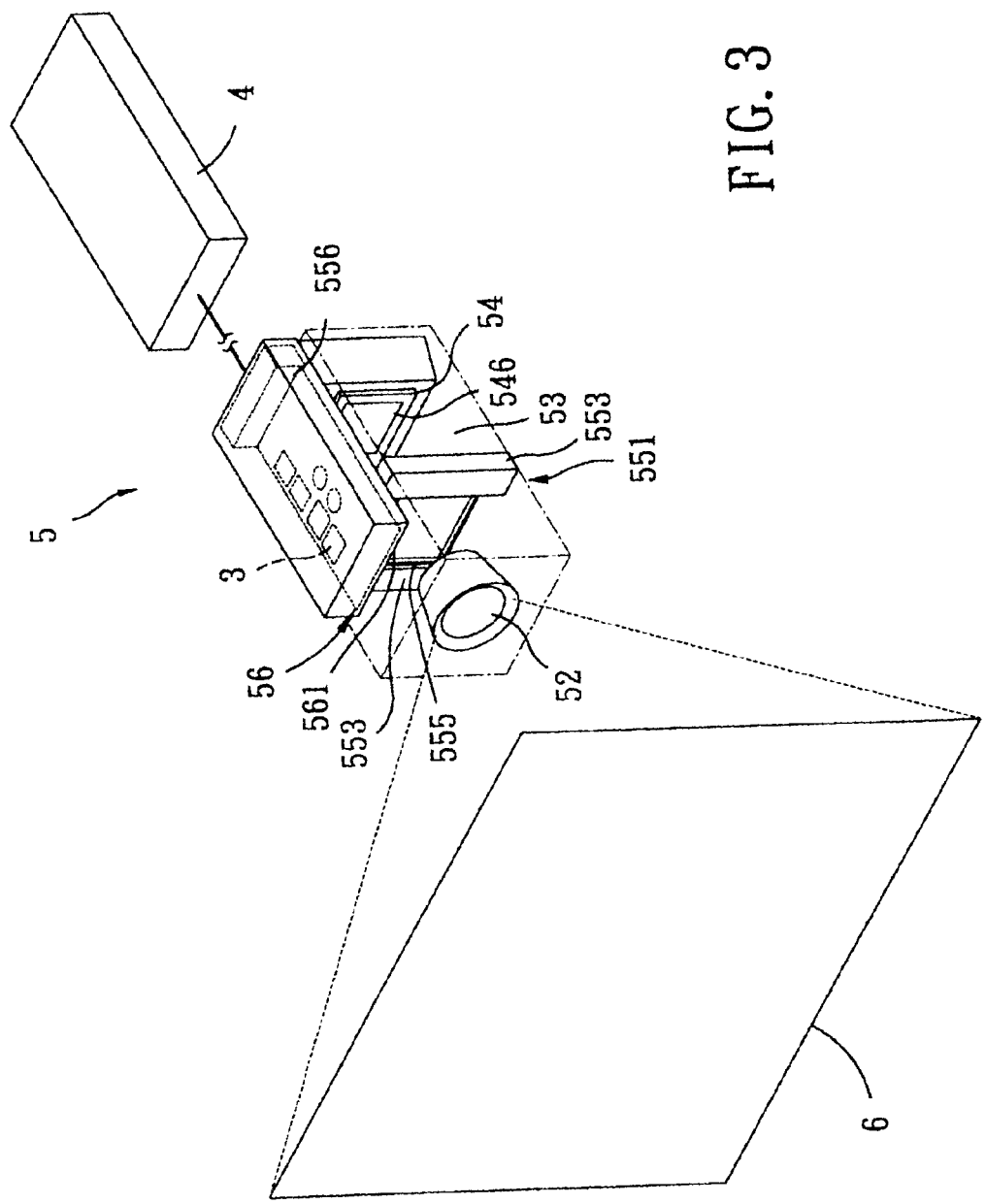
FIG. 3 is an assembled perspective view of the preferred embodiment when operated in a liquid crystal projection mode.

In use, as shown in FIG. 3, to operate the image projector system 5 in a liquid crystal projection mode, the slide frame 555 of the liquid crystal module 56 is inserted into the housing 51 through the slide insert slot 552 until the cover member 556 closes the slide insert slot 552. The image projector system 5 is then placed in front of a screen 6, and the control circuit 3 of the liquid crystal module 56 is connected to the image signal source 4. When power is turned on, cold light from the cold light source 54 will be modulated by the liquid crystal panel 561 in a conventional manner according to the image signals received by the control circuit 3 from the image signal source 4. The modulated light from the liquid crystal panel 561 is then received by the projection lens 52 for subsequent projection onto the screen 6.

Figure 4:
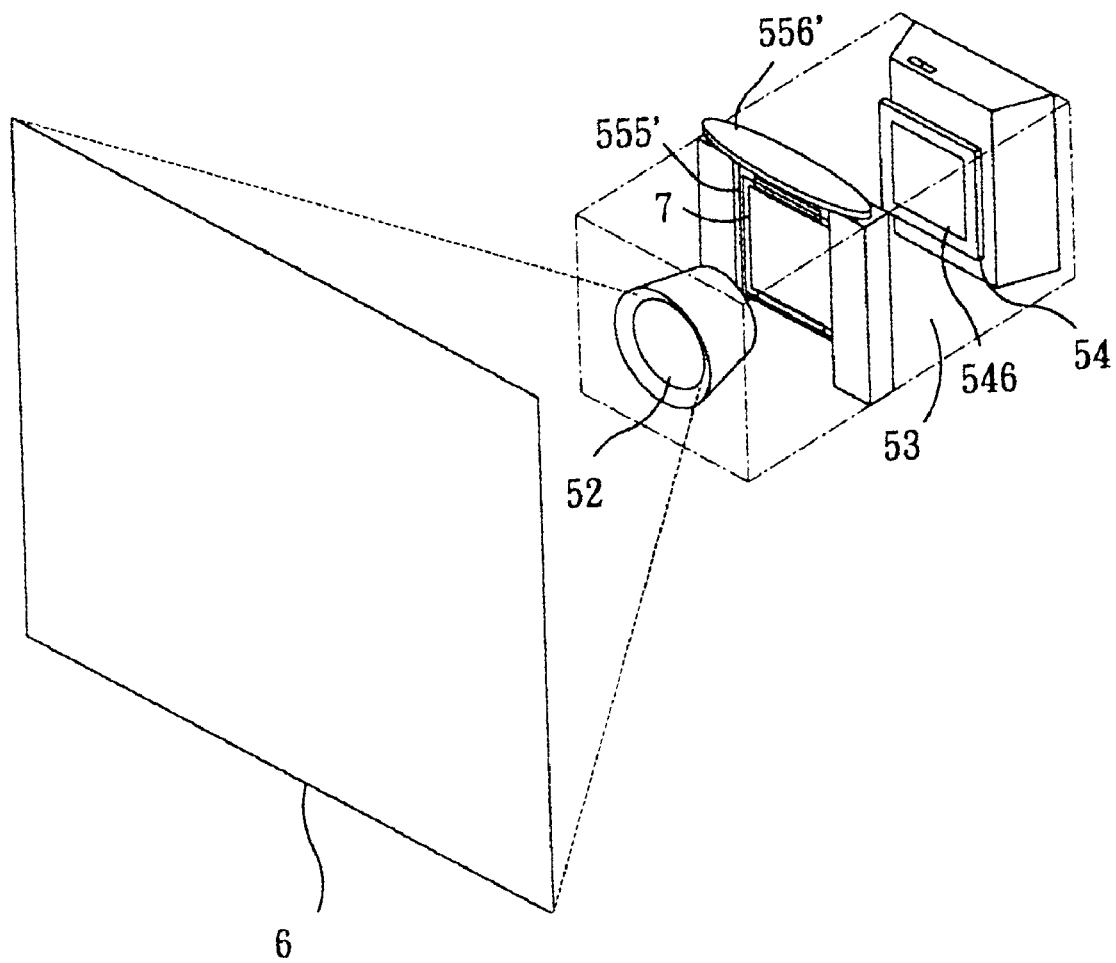
FIG. 4 is an assembled perspective view of the preferred embodiment when operated in a slide projection mode.

To operate the image projector system 5 in a slide projection mode, as shown in FIG. 4, the projector slide 7 is mounted on the slide frame 555', and the slide frame 555' is subsequently inserted into the housing 51 through the slide insert slot 552 until the cover plate 556' closes the slide insert slot 552. The image projector system 5 is then placed in front of a screen 6. When power is turned on, the cold light from the cold light source 54 will pass through the projector slide 7 and the projection lens 52 for forming a corresponding image on the screen 6.

The image projector system of this invention offers advantages, such as wider range of use, lower energy consumption, longer service life, lower manufacturing cost, and simpler manufacturing process, as compared to the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An image projector system comprising:

a cold light source;

a projection lens;

a slide retaining unit disposed between said cold light source and said projection lens, said slide retaining unit being adapted to retain removably a projector slide between said cold light source and said projection lens when said image projector system is operated in a slide projection mode; and a liquid crystal module including a liquid crystal panel retained removably on said slide retaining unit between said cold light source and said projection lens to permit operation of said image projector system in a liquid crystal projection mode.

2. The image projector system as claimed in claim 1, wherein said cold light source includes a light guide member having a light incident side for admitting incident light and a light output side for outputting the incident light, and a light emitting unit for providing the incident light to said light incident side of said light guide member.

3. The image projector system as claimed in claim 2, wherein said light guide member further has a light reflecting side opposite to said light output side and provided with a reflector layer thereon, said light incident side extending between said light reflecting side and said light output side.

4. The image projector system as claimed in claim 3, wherein said light emitting unit includes at least a light emitting diode mounted adjacent to said light incident side of said light guide member.

5. The image projector system as claimed in claim 1, wherein said cold light source has a planar light output side for radiating cold light toward said slide retaining unit.

6. The image projector system as claimed in claim 1, further comprising a housing having front and rear portions, said projection lens being mounted on said front portion of said housing, said cold light source being mounted in said rear portion of said housing, said slide retaining unit being disposed in said housing between said projection lens and said cold light source.

7. The image projector system as claimed in claim 6, wherein said housing is formed with a slide insert slot registered with said slide retaining unit to permit insertion of a selected one of the projector slide and said liquid crystal panel into said housing for removable retention by said slide retaining unit.

8. The image projector system as claimed in claim 7, wherein said liquid crystal module further includes a slide frame having said liquid crystal panel mounted thereon, said slide frame being capable of removable and slidable engagement with said slide retaining unit.

9. The image projector system as claimed in claim 8, wherein said slide frame has one end connected to a cover member that closes said slide insert slot when said slide frame is inserted into said housing.

10. The image projector system as claimed in claim 7, further comprising a slide frame adapted for mounting the projector slide thereon, said slide frame being capable of removable and slidable engagement with said slide retaining unit.

11. The image projector system as claimed in claim 10, wherein said slide frame has one end formed with a cover plate to close said slide insert slot when said slide frame is inserted into said housing.

12. The image projector system as claimed in claim 1, wherein said liquid crystal module further includes a control circuit connected electrically to said liquid crystal panel, said control circuit being adapted to be connected to an image signal source and controlling operation of said liquid crystal panel according to image signals received from the image signal source.

* * * * *